US008565213B2

(12) United States Patent
Song et al.

(10) Patent No.: US 8,565,213 B2
(45) Date of Patent: Oct. 22, 2013

(54) APPARATUS AND METHOD FOR ESTIMATING UPLINK TRANSMISSION TIMING IN WIRELESS COMMUNICATION SYSTEM

(75) Inventors: Tae-Ik Song, Suwon-si (KR); Young-Hak Kim, Suwon-si (KR); Jong-Han Lim, Seoul (KR); Jeong-Hoon Park, Suwon-si (KR); Jae-Hwan Chang, Suwon-si (KR); Kang-Gyu Lee, Yongin-si (KR); In-Hyoung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 12/232,490

(22) Filed: Sep. 18, 2008

(65) Prior Publication Data

US 2009/0086714 A1    Apr. 2, 2009

(30) Foreign Application Priority Data

Sep. 27, 2007   (KR) ................. 10-2007-0097180

(51) Int. Cl.
*H04J 3/06* (2006.01)
*H04B 15/00* (2006.01)

(52) U.S. Cl.
CPC .................... *H04J 3/0682* (2013.01)

USPC ............ 370/350; 370/503; 370/508; 455/502

(58) Field of Classification Search
USPC ................ 370/329, 345, 350, 503, 509, 519; 455/502
See application file for complete search history.

(56) References Cited

U.S. PATENT DOCUMENTS

| 7,031,277 | B2 * | 4/2006 | Choi et al. ................ 370/331 |
|---|---|---|---|
| 7,912,425 | B2 * | 3/2011 | Ihm et al. ................ 455/39 |
| 2001/0005907 | A1 * | 6/2001 | Pekonen ................ 725/111 |
| 2003/0210713 | A1 * | 11/2003 | Abdel-Ghaffar ............ 370/503 |
| 2006/0083168 | A1 * | 4/2006 | Prakash .................. 370/230 |
| 2006/0285554 | A1 * | 12/2006 | Schaller .................. 370/470 |
| 2007/0058524 | A1 * | 3/2007 | Modlin et al. ............. 370/208 |
| 2008/0186949 | A1 * | 8/2008 | Hafeez et al. ............. 370/350 |
| 2008/0232329 | A1 * | 9/2008 | Jen ...................... 370/335 |
| 2009/0180443 | A1 * | 7/2009 | Kawasaki et al. ........... 370/331 |

\* cited by examiner

*Primary Examiner* — Ayaz Sheikh
*Assistant Examiner* — Hoang-Chuong Vu
(74) *Attorney, Agent, or Firm* — Roylance, Abrams, Berdo & Goodman, L.L.P.

(57) ABSTRACT

An apparatus and method for estimating UpLink (UL) transmission timing in a Mobile Station (MS) of a wireless communication system are provided. The method includes tracking DL timing by using a DL preamble signal received for each frame; estimating a time offset between a previous frame and a current frame by using the DL timing tracked for each frame; and estimating the UL transmission timing by using the estimated time offset.

8 Claims, 5 Drawing Sheets

APPARATUS AND METHOD FOR ESTIMATING UPLINK TRANSMISSION TIMING IN WIRELESS COMMUNICATION SYSTEM

PRIORITY

This application claims priority under 35 U.S.C. §119(a) from Korean Patent Application No. 2007-97180 filed on Sep. 27, 2007, in the Korean Intellectual Property Office, the entire disclosure of which is hereby incorporated by reference.

BACKGROUND OF THE INVENTION

1. Field of the Invention

The present invention relates to an apparatus and method for estimating UpLink (UL) transmission timing in a wireless communication system. More particularly, the present invention relates to an apparatus and method for regulating UL transmission timing by estimating a time offset between DownLink (DL) reception frames in a Mobile Station (MS) of a wireless communication system.

2. Description of the Related Art

Typical examples of a 4th Generation (4G) communication system include an Institutes of Electrical and Electronics Engineers (IEEE) 802.16d system and an IEEE 802.16e system. The IEEE802.16 d/e system may be implemented based on Wimax, Wibro, or Mobile Wimax.

In the conventional Mobile Wimax (or Wibro) system, a Mobile Station (MS) tracks DownLink (DL) timing by using a DL preamble signal received for each frame so as to achieve a time synchronization between a Base Station (BS) and the MS, predicts UpLink (UL) transmission timing by using the tracked DL timing, and transmits an UL frame. When timing for receiving the UL frame does not coincide with UL frame reception timing of the BS, the BS transmits a ranging response message to the MS and thus instructs the MS to regulate the UL transmission timing.

FIG. 1 illustrates UL/DL transmission/reception timings between an MS and a BS.

In FIG. 1, the DL transmission timing of the BS is T1 101, and the UL reception timing of the BS is T2 103. In the BS, a DL period, a UL period, a Transmit Time Gap (TTG), and a Receive Time Gap (RTG) do not change, and the sum of respective time periods is 5 ms.

When the BS transmits a DL frame at the transmission timing T1 101 in step S1, the MS receives the DL frame after a propagation delay time elapses from the transmitting timing T1 101 in step S2. The propagation delay time may be defined as a half of a Round Trip Delay (RTD) time, that is, RTD/2.

Upon receiving the DL frame, the MS predicts a time interval T between a DL period and a UL period by using a DL preamble signal. Then, the MS transmits a UL frame to the BS at a time which is prior to the timing T2 103 by the propagation delay time (that is, RTD/2) in step S3. Accordingly, in step S4, the BS can receive the UL frame transmitted from the MS at the timing T2. After receiving the DL frame as shown in step A1, the MS predicts a time interval T between a DL period and a UL period, and transmits the UL frame after the time interval T elapses. Thus, the BS can correctly receive the UL frame at the UL reception timing T2 as shown in step A2.

When the MS moves apart from the BS in a state that the time interval T is predicted as described above, due to the movement of the MS, the MS receives the DL frame from the BS in step F1 after a propagation delay time D elapses, wherein the propagation delay time D is greater than the propagation delay time (that is, RTD/2) in step S2. Due to the movement of the MS, a time synchronization between the BS and the MS changes. However, since the UL timing is not predicted until a ranging response message is received, the MS transmits the UL frame in step F2 by using the previously predicted time interval T. Accordingly, the BS receives the UL frame at a time later than the original UL frame reception timing in step F3. Since the MS transmits the UL frame by using the time interval T even if a propagation delay time changes as shown in step B 1, the BS receives the UL frame at a time later than the original reception timing T2 103 as shown in step B2.

On the contrary, when the MS moves close to the BS, if the UL frame transmission timing is determined by using the aforementioned time tracking method, the BS receives the UL frame at a time which is prior to the timing T2 103 at which the UL frame is received in practice.

As described above, a method for transmitting a UL frame by predicting UL transmission timing according to DL timing can correctly operate in an environment where an MS exists in a fixed location and thus a propagation delay and a channel state do not change. However, in an environment where the MS moves and thus the propagation delay and the channel state continuously change, the UL transmission timing cannot be correctly predicted.

In addition, changes in a channel state between the BS and the MS result in changes in signal strengths of signals received through paths having different delays in a multi-path scenario. Thus, a reference path, which is used by the MS to track the timing, may also change. For example, as shown in FIG. 2, when a path having a maximum signal strength changes from a first path to a second path, the reference path used for timing tracking is shifted by D.

As described above, in a method for predicting UL transmission timing in an MS, the UL transmission timing is regulated only when a ranging response message is received from a BS. Therefore, disadvantageously, the method cannot proactively deal with changes in a propagation delay or a channel state. Since the ranging response message is not received for each frame, the MS uses incorrectly predicted UL transmission timing until the ranging response message is received. As a result, the BS cannot receive a UL transmission frame at correct timing. Accordingly, link throughput deteriorates, which leads to overall quality deterioration.

Accordingly, there is a need for an apparatus and method for regulating UL transmission timing by estimating a time offset between DownLink (DL) reception frames in a Mobile Station (MS) of a wireless communication system.

SUMMARY OF THE INVENTION

Exemplary embodiments of the present invention address at least the above-mentioned problems and/or disadvantages and to provide at least the advantages described below. Accordingly, an aspect of exemplary embodiments of the present invention is to provide an apparatus and method for estimating UpLink (UL) transmission timing in a wireless communication system.

It is another aspect of an exemplary embodiment of the present invention to provide an apparatus and method for regulating UL transmission timing for each frame according to changes in a channel state in a Mobile Station (MS) of a wireless communication system.

According to one aspect of an exemplary embodiment of the present invention, there is provided an apparatus and method for regulating UL transmission timing for each frame by estimating a time offset between DownLink (DL) reception frames in an MS of a wireless communication system.

According to another aspect of an exemplary embodiment of the present invention, a method of estimating UL transmission timing in an MS of a wireless communication system is provided. The method includes tracking DL timing by using a DL preamble signal received for each frame; estimating a time offset between a previous frame and a current frame by using the DL timing tracked for each frame; and estimating the UL transmission timing by using the estimated time offset.

According to a further aspect of an exemplary embodiment of the present invention, an apparatus for estimating UL transmission timing in an MS of a wireless communication system is provided. The apparatus includes a DL time tracker for tracking DL timing by using a DL preamble signal received for each frame; a time offset estimator for estimating a time offset between a previous frame and a current frame by using the DL timing tracked for each frame; and a UL time estimator for estimating the UL transmission timing by using the estimated time offset.

Other objects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, an apparatus and method of an exemplary embodiment of the present invention will be described in which UpLink (UL) transmission timing is regulated for each frame by estimating a time offset between DownLink (DL) reception frames in a Mobile Station (MS) of a wireless communication system.

Figure 1:
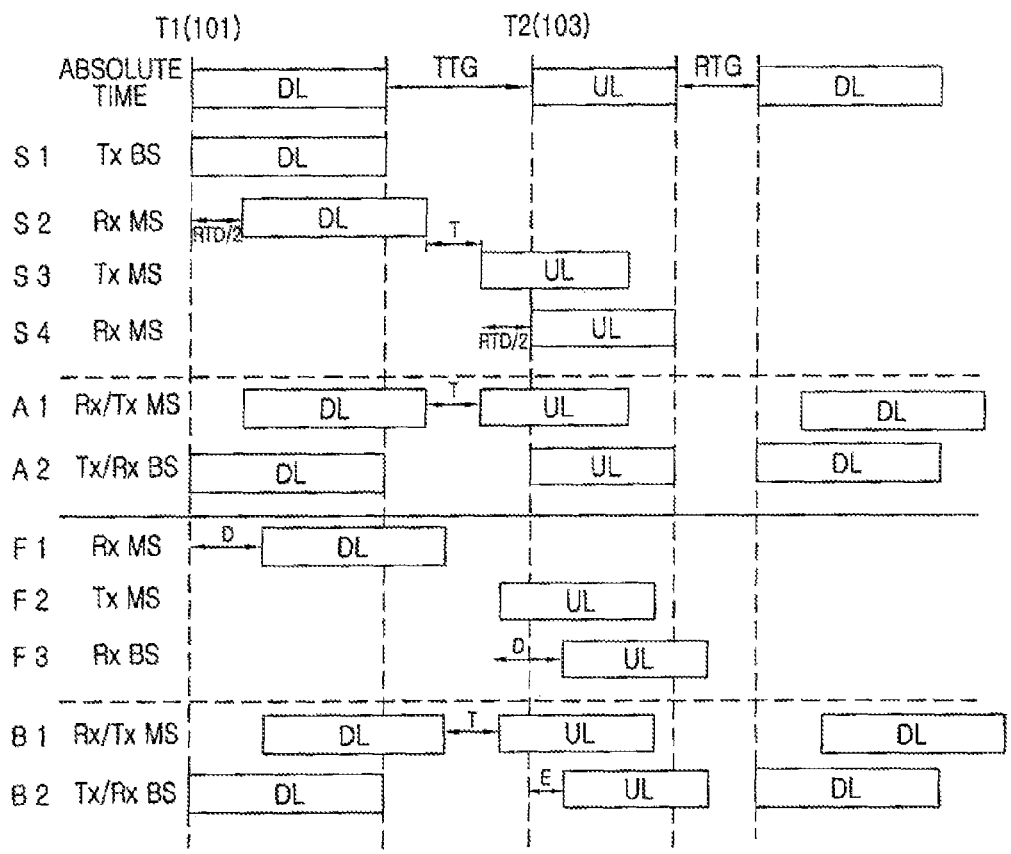
FIG. 1 illustrates UpLink (UL)/DownLink (DL) transmission/reception timings between a Mobile Station (MS) and a Base Station (BS)
Figure 2:
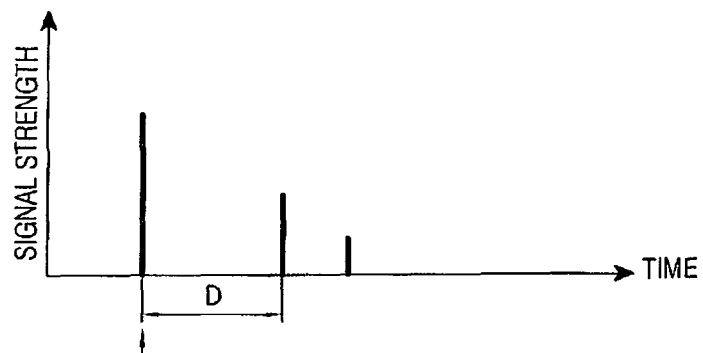
FIG. 2 is a graph illustrating changes in a reference signal in response to changes in a channel state between an MS and a BS.
Figure 2:
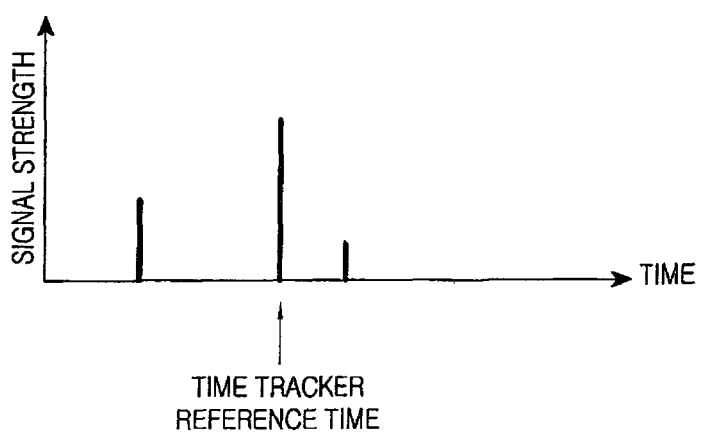
Figure 3:
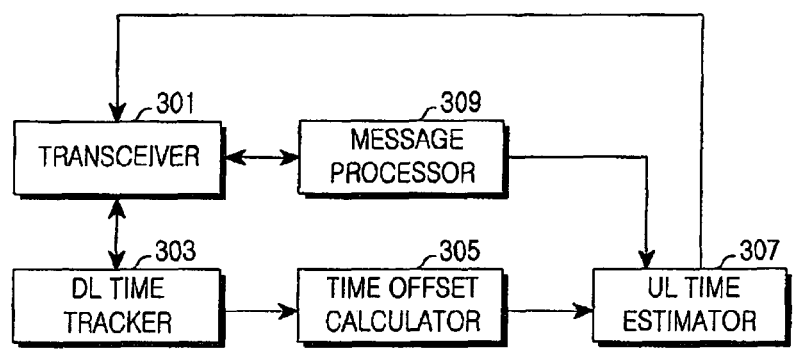
FIG. 3 is a block diagram illustrating a structure of an MS in a wireless communication system according to an exemplary embodiment of the present invention.

FIG. 3 is a block diagram illustrating a structure of an MS in a wireless communication system according to an exemplary embodiment of the present invention.

Referring to FIG. 3, the MS includes a transceiver 301, a DL time tracker 303, a time offset calculator 305, a UL time estimator 307, and a message processor 309.

The transceiver 301 transmits and receives signals to/from the BS. That is, the transceiver 301 receives a DL signal from the BS and provides the DL signal to the message processor 309. Further, the transceiver 301 receives a UL signal from the message processor 309 and provides the UL signal to the BS. In addition, the transceiver 301 provides the DL time tracker 303 with a DL preamble signal received for each frame, receives information on UL transmission timing from the UL time estimator 307, and transmits the UL signal at the UL transmission timing.

The DL time tracker 303 tracks DL timing by using a DL preamble signal provided from the transceiver 301 and provides the time offset calculator 305 with a time for receiving a DL frame.

Figure 5:
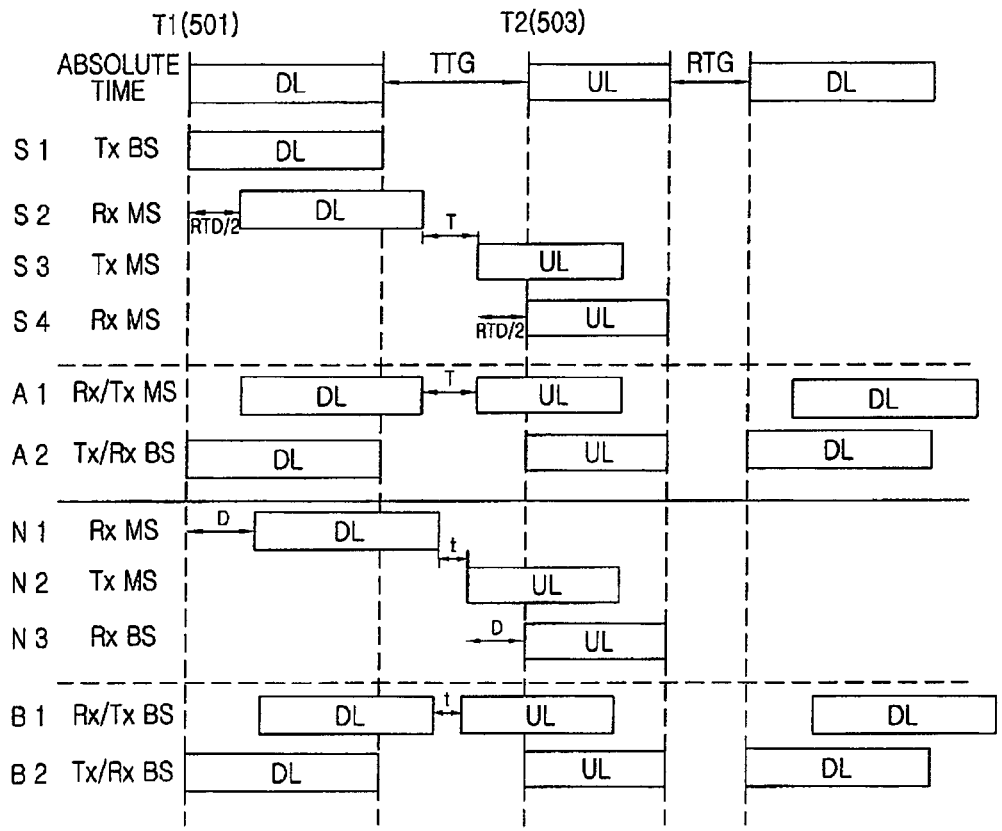
FIG. 5 illustrates UL/DL transmission/reception timings between a BS and an MS in a wireless communication system according to an exemplary embodiment of the present invention.

The time offset calculator 305 receives the time for receiving the DL frame from the DL time tracker 303. Thus, for each frame, the time offset calculator 305 calculates a time offset between a current frame and a previous frame. Thereafter, the time offset calculator 305 calculates a time for regulating UL transmission timing according to the calculated time offset. For example, as shown in FIG. 5, the time offset calculator 305 compares a frame reception time between a DL frame received with a delay time RTD/2 in step S2 and a DL frame received with a time delay D in step N1, and thus calculates a time offset between the two frames, that is, D-RTD/2. Thereafter, the time offset calculator 305 calculates a time for regulating the UL transmission timing which is twice the calculated time offset. The reason why the time for regulating the UL transmission timing is twice the time offset (that is, 2(D-RTD/2)) is that the calculation is carried out in consideration of changes in a propagation delay in both a DL signal and a UL signal.

The UL time estimator 307 receives the time for regulating the UL transmission timing from the time offset calculator 305 and regulates the UL transmission timing of the current frame. The UL time estimator 307 subtracts the time for regulating the UL transmission timing from the previously predicted time interval T between the DL period and the UL period and thus regulates UL transmission timing of the current frame. For example, as shown in FIG. 5, when a DL frame is received in step N1 after a propagation delay time D elapses, a new time interval t is calculated by subtracting the transmission timing regulation time (that is, 2(D-RTD/2)) from the time T predicted in step S2, and according to the computation result, UL transmission timing is regulated.

The UL time estimator 307 receives a time regulation value included in a ranging response message from the message processor 309 and thus regulates the UL transmission timing of the current frame.

The message processor 309 receives a DL signal from the transceiver 301 and processes the DL signal. Further, the message processor 309 processes a signal to be transmitted to the BS and then provides the signal to the transceiver 301. In particular, when the ranging response message is received from the transceiver 301, the message processor 309 determines if a time synchronization is successful by using the ranging response message. If the time synchronization is not successful, the message processor 309 determines that the UL transmission timing of the current frame is inaccurately predicted, extracts the time regulation value included in the ranging response message, and provides the time regulation value to the UL time estimator 307.

Figure 4:
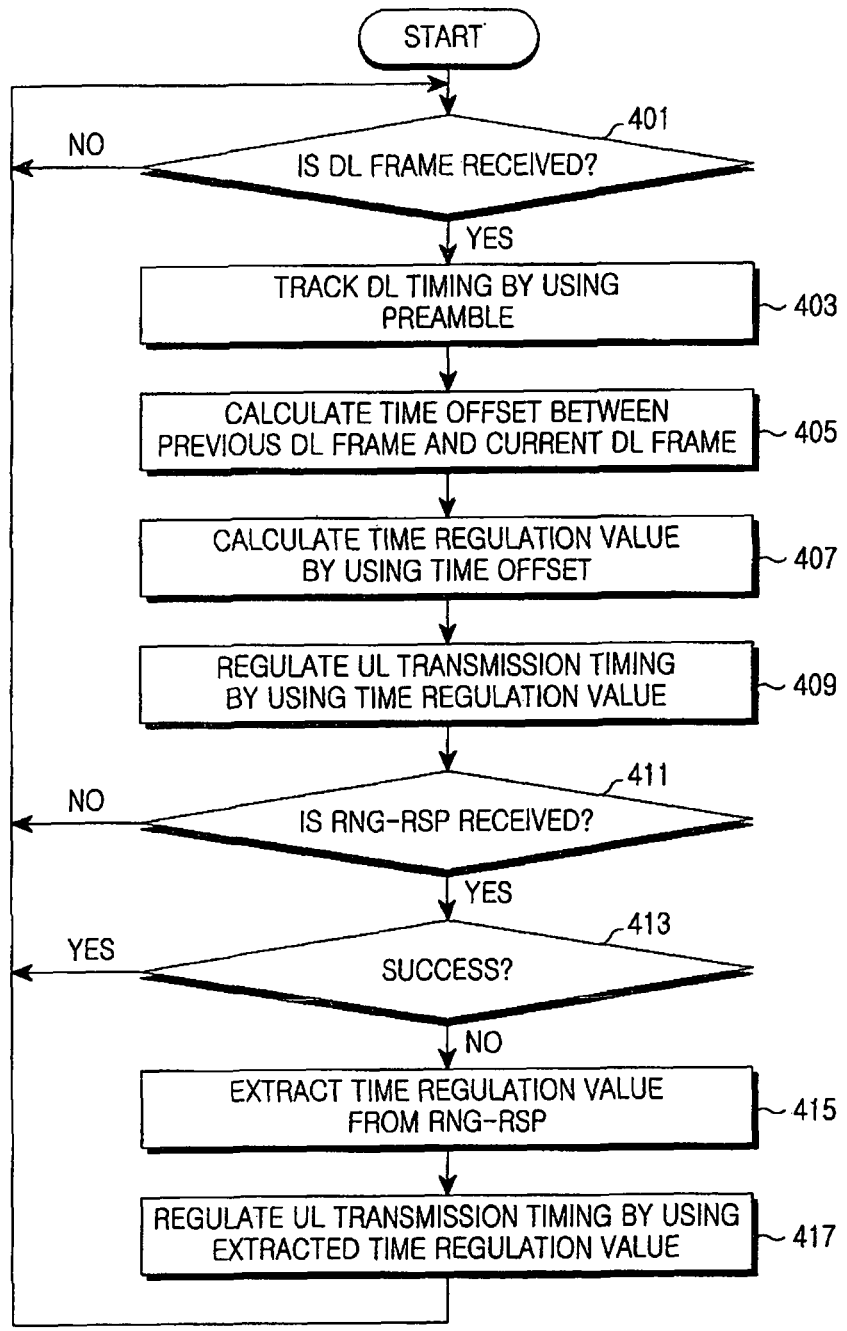
FIG. 4 is a flowchart illustrating a process of estimating UL transmission timing in an MS of a wireless communication system according to an exemplary embodiment of the present invention.

FIG. 4 is a flowchart illustrating a process of estimating UL transmission timing in an MS of a wireless communication system according to an exemplary embodiment of the present invention.

Referring to FIG. 4, when a DL frame is received in step 401, the MS tracks DL timing by using a preamble signal included in the DL frame in step 403.

In step 405, the MS calculates a time offset between the currently received DL frame and a previously received DL frame. In step 407, the MS calculates a time regulation value for regulating UL transmission timing by using the time offset. In other words, the MS calculates a time offset (that is, D-RTD/2), which is, a difference between a propagation delay time D of the current DL frame and a propagation delay time RTD/2 of the previous DL frame, and determines the time regulation value to be a time (that is, 2(D-RTD/2)) which corresponds to twice the amount of the time offset.

In step 409, the MS regulates the UL transmission timing by using the time regulation value. Said MS subtracts the time regulation value from the previous UL Transmission (Tx) timing (that is, Tx Timing-2(D-RTD/2)), thereby obtaining a current UL Tx timing. Herein, the MS transmits a UL frame to the BS at the regulated current UL Tx timing.

In step 411, the MS determines if a RaNGing ReSPonse (RNG-RSP) message is received from the BS. If the RNG-RSP message is not received, the procedure proceeds to step 401. Otherwise, if the RNS-RSP message is received, in step 413, the MS analyzes the RNG-RSP message to determine if a time synchronization is successfull.

If the result of analyzing the RNG-RSP message shows that the time synchronization is successful, returning back to step 401, the MS repeats the subsequent steps. Otherwise, if the time synchronization fails, in step 415, the MS extracts the time regulation value included in the RNG-RSP message. Then, in step 417, the MS regulates the UL transmission timing by using the extracted time regulation value. Thereafter, returning back to step 401, the MS repeats the subsequent steps.

FIG. 5 illustrates UL/DL transmission/reception timings between a BS and an MS in a wireless communication system according to an exemplary embodiment of the present invention.

In FIG. 5, a DL transmission timing of the BS is T1 501, and a UL reception timing of the BS is T2 503. In the BS, a DL period, a UL period, a Transmit Time Gap (TTG), and a Receive Time Gap (RTG) do not change, and the sum of respective time periods is 5 ms.

When the BS transmits a DL frame at the transmission timing T1 in step S1, the MS receives the DL frame after a propagation delay time elapses from the transmission timing T1 in step S2. The propagation delay time may be defined as a half of a Round Trip Delay (RTD) time, that is, RTD/2.

Upon receiving the DL frame, the MS predicts a time interval T between a DL period and a UL period by using a DL preamble signal. Thereafter, the MS transmits a UL frame to the BS at a time which is prior to the timing T2 by the propagation delay time (that is, RTD/2) in step S3. Accordingly, in step S4, the BS can receive the UL frame transmitted from the MS at the timing T2 103. After receiving the DL frame as shown in step A1, the MS predicts a time interval T between a DL period and a UL period, and transmits the UL frame after the time interval T elapses. Thus, the BS can correctly receive the UL frame at the UL reception timing T2 103 as shown in step A2.

When the MS moves apart from the BS in a state that the time interval T is predicted as described above, due to the movement of the MS, the MS receives the DL frame from the BS in step N1 after a propagation delay time D elapses, wherein the propagation delay time D is greater than the propagation delay time (that is, RTD/2) in step S2. Due to the movement of the MS, a time synchronization between the BS and the MS changes.

In order to estimate the UL transmission timing depending on the modified time synchronization, the MS calculates a time offset (that is, D-RTD/2) between a DL frame received in step N1 and a DL frame received in step S2, thereby obtaining a time regulation value (that is, 2(D-RTD/2)). Thereafter, the MS subtracts the time regulation value from the predicted time interval T (that is, T-2(D-RTD/2)), thereby obtaining a new time interval t. The MS then predicts the UL transmission timing and transmits a UL frame at the predicted UL transmission timing in step N2.

Therefore, the BS can receive the UL frame transmitted from the MS at the original UL reception timing T2 in step N3. That is, as a signal propagation delay time between the MS and the BS changes due to the movement of the MS or due to changes in a channel state, the MS predicts the UL transmission timing in consideration of a propagation delay time modified as shown in step B1. As a result, the BS can receive the UL frame at the original reception timing T2 as shown in step B2.

According to an exemplary embodiment of the present invention, in an MS of a wireless communication system, a time offset is estimated by using a DL reception frame, and thus UL transmission timing is regulated for each frame. Therefore, changes in a channel state can be proactively dealt with by simply modifying a software component without having to change or add a hardware component. In addition, there is an advantage in that a call quality can be improved by improving link throughput.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of estimating UpLink (UL) transmission timing in a Mobile Station (MS) of a wireless communication system, the method comprising:
   tracking DownLink (DL) timing by using a DL preamble signal received for each frame;
   estimating a time offset between a previous DL frame and a current DL frame by using the DL timing tracked for each frame; and
   estimating the UL transmission timing by using the estimated time offset;
   wherein, estimating the time offset between the previous DL frame and the current DL frame comprises estimating a difference between a propagation delay time of the current DL frame and a propagation delay time of the previous DL frame; and
   wherein the estimating the UL transmission timing by using the estimated time offset comprises calculating a time regulation value by using the estimated time offset and subtracting the time regulation value from a time interval between an end time of the previous DL frame and a start time of a previous UL frame.

2. The method of claim 1, further comprising:
   transmitting a UL signal at the UL transmission timing;
   receiving a ranging response message from a Base Station (BS); and
   determining if a time synchronization is successful by using the ranging response message.

3. The method of claim 2, wherein, when the determination result shows that the time synchronization fails, regulating the UL transmission timing by extracting the time regulation value included in the ranging response message.

4. An apparatus for estimating UpLink (UL) transmission timing in a Mobile Station (MS) of a wireless communication system, the apparatus comprising:
   a DownLink (DL) time tracker for tracking DL timing by using a DL preamble signal received for each frame;
   a time offset estimator for estimating a time offset between a previous DL frame and a current DL frame by using the DL timing tracked for each frame; and
   a UL time estimator for estimating the UL transmission timing by using the estimated time offset;
   wherein the time offset estimator estimates the time offset by estimating a difference between a propagation delay time of the current DL frame and a propagation delay time of the previous DL frame;
   wherein the time offset estimator calculates a time regulation value by using the estimated time offset; and
   wherein the UL time estimator subtracts the time regulation value from a time interval between an end time of the previous DL frame and a start time of a previous UL frame.

5. The apparatus of claim 4, further comprising a transceiver for receiving a DL signal for each frame and for transmitting a UL signal at the UL transmission timing tracked by the UL time estimator.

6. The apparatus of claim 4, further comprising:
   a message processor for determining if a time synchronization is successful by using a ranging response message received from a Base Station (BS), and, if the determination result shows that the time synchronization fails, for extracting a time regulation value included in the ranging response message,
   wherein the UL time estimator regulates the UL transmission timing by using the extracted time regulation value.

7. A non-transitory computer-readable medium having embodied thereon a program code for executing a method comprising:
   tracking DownLink (DL) timing by using a DL preamble signal received for each frame;
   estimating a time offset between a previous DL frame and a current DL frame by using the DL timing tracked for each frame; and
   estimating an UpLink (UL) transmission timing by using the estimated time offset;
   wherein estimating the time offset between the previous DL frame and the current DL frame comprises estimating a difference between a propagation delay time of the current DL frame and a propagation delay time of the previous DL frame; and
   wherein the estimating the UL transmission timing by using the estimated time offset comprises calculating a time regulation value by using the estimated time offset and subtracting the time regulation value from a time interval between an end time of the previous DL frame and a start time of a previous UL frame.

8. A Mobile Station (MS) for estimating UpLink (UL) transmission timing, comprising:
   means for tracking DownLink (DL) timing by using a DL preamble signal received for each frame;
   means for estimating a time offset between a previous DL frame and a current DL frame by using the DL timing tracked for each frame; and
   means for estimating the UL transmission timing by using the estimated time offset;
   wherein estimating the time offset between the previous DL frame and the current DL frame comprises estimating a difference between a propagation delay time of the current DL frame and a propagation delay time of the previous DL frame; and
   wherein the estimating the UL transmission timing by using the estimated time offset comprises calculating a time regulation value by using the estimated time offset and subtracting the time regulation value from a time interval between an end time of the previous DL frame and a start time of a previous UL frame.

* * * * *